United States Patent
Tolliver

(10) Patent No.: US 8,208,252 B2
(45) Date of Patent: Jun. 26, 2012

(54) INFRARED ENERGY POWERED COOLING APPARATUS AND COMPUTER CHASSIS COMPRISING SAME

(75) Inventor: Eric W. Tolliver, Moorpark, CA (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 0 days.

(21) Appl. No.: 12/590,282

(22) Filed: Nov. 5, 2009

(65) Prior Publication Data

US 2011/0103006 A1 May 5, 2011

(51) Int. Cl.
*G06F 1/20* (2006.01)
*H05K 7/20* (2006.01)
*H01L 33/00* (2006.01)

(52) U.S. Cl. ........... 361/679.49; 361/679.48; 361/679.5; 361/690; 361/694; 361/695; 361/720; 361/721; 136/205; 136/207; 454/184

(58) Field of Classification Search ............. 361/679.46, 361/679.48–679.49, 690, 694–695, 719–721; 165/80.2–80.3, 185; 62/3.2, 3.7, 259.2; 363/141; 454/184; 136/205, 207

See application file for complete search history.

(56) References Cited

U.S. PATENT DOCUMENTS

| | | | | |
|---|---|---|---|---|
| 5,419,780 A * | 5/1995 | Suski | ............................. | 136/205 |
| 5,921,087 A * | 7/1999 | Bhatia et al. | ..................... | 62/3.2 |
| 6,300,150 B1 * | 10/2001 | Venkatasubramanian | ...... | 438/27 |
| 6,799,282 B2 * | 9/2004 | Maeda et al. | ................. | 713/500 |
| 7,081,684 B2 * | 7/2006 | Patel et al. | ..................... | 290/1 R |
| 7,242,580 B1 * | 7/2007 | Tanaka | .......................... | 361/696 |
| 7,712,325 B2 * | 5/2010 | Shapiro | ........................ | 62/259.2 |
| RE41,801 E * | 10/2010 | Venkatasubramanian | ........ | 438/3 |
| 7,812,245 B2 * | 10/2010 | Reid | ............................. | 136/205 |
| 7,939,743 B2 * | 5/2011 | Leng et al. | ..................... | 136/205 |
| 2004/0108104 A1 * | 6/2004 | Luo | ................................ | 165/181 |
| 2007/0056622 A1 * | 3/2007 | Leng et al. | ..................... | 136/205 |
| 2008/0110494 A1 | 5/2008 | Reddy | | |
| 2008/0142075 A1 | 6/2008 | Reddy et al. | | |
| 2008/0230120 A1 | 9/2008 | Reddy | | |
| 2010/0043858 A1 * | 2/2010 | Matsui et al. | ................. | 136/205 |
| 2011/0023928 A1 * | 2/2011 | Leng et al. | ..................... | 136/205 |

* cited by examiner

*Primary Examiner* — Robert J Hoffberg

(57) ABSTRACT

A computer system has a chassis, a plurality of interconnected panels mounted on the chassis in a manner defining an interior space at least partially encompassed by the panels, a circuit assembly, an electrically-powered fan within the interior space, and an energy conversion device mounted within the interior space. One or more of the panels has an airflow opening therein. The circuit assembly is mounted on the chassis within the interior space and includes a heat generating system component. The heat generating system component includes a surface from which energy in the infrared (IR) electromagnetic spectrum is emitted during operation thereof. The energy conversion device is configured for converting the emitted infrared energy to electrical energy and is electrically connected to the electrically-powered fan for providing the electrical energy thereto.

11 Claims, 3 Drawing Sheets

INFRARED ENERGY POWERED COOLING APPARATUS AND COMPUTER CHASSIS COMPRISING SAME

FIELD OF THE DISCLOSURE

The disclosures made herein relate generally to electrically powered cooling apparatuses and, more particularly, to a computer enclosure having an infrared energy powered cooling apparatus integral therewith.

BACKGROUND

It is well known that certain system components within an enclosure of a data computing apparatus (e.g., a computer system) generate a substantial mount of heat. It is also well known that heat is one, if not the largest, contributor to failure and/or poor performance of system components mounted within an enclosure. Examples of an enclosure of a data computing apparatuses include, but are not limited to, enclosures having server modules mounted therein, enclosures having central processor units mounted therein, enclosures having storage units mounted therein, and the like. Examples of heat-generating system components include, but are not limited to, power supplies, processors, functionality cards (e.g., graphics cards), memory devices, cooling fans, and the like.

To combat the adverse affects of heat on system components mounted within an enclosure, one or more electrically-powered fans are typically used to extract heat from within the enclosure. These one or more fans consume a significant amount of electrical power. Currently, computer systems are designed in a manner that scales up their power supply to handle the additional needs of the fans such that power beyond that needed for the system components can be consumed by the one of more fans. However, given the current business and societal focus on reducing energy consumption, a means for reducing power consumption at the power supply of a data computing apparatus would be advantageous, desirable and useful.

SUMMARY OF THE DISCLOSURE

To combat the adverse affects of heat on system components mounted within an enclosure, embodiments of the present invention use one or more infrared (IR) energy conversion devices at least partially power one or more electrically-powered fans. The benefit of such an approach to extracting heat from within an enclosure is reduced power consumption from a power grid (e.g., power from conventional power plants). In one embodiment, an energy conversion device as disclosed herein includes thin-film IR energy absorbing energy conversion cells. As such, most or all of the heat-generating system components within the enclosure emit infrared energy. The one or more infrared energy conversion units convert a portion of that emitted IR energy to electrical energy and provide it to the one or more electrically operated fans. In this manner, IR energy emitted from the heat-generating system components is used for extracting heat from within the enclosure through powering of the one or more electrically-powered fans. Infrared light (i.e., energy) lies between the visible and microwave portions of the electromagnetic spectrum and is the type of energy emitted from most heat-generating components in manmade electronic apparatuses.

In one embodiment of the present invention, a forced-induction airflow apparatus for a computer system comprises an enclosure, an electrically-powered airflow-inducing device, and an energy conversion device. The enclosure has an interior space therein. The enclosure is configured for having one or more computer system components mounted thereon within the interior space. An electrically-powered airflow-inducing device is mounted on the enclosure in a manner for allowing circulation of air between an ambient environment and the interior space. The energy conversion device is mounted within the interior space. The energy conversion device is configured for converting infrared (IR) energy to electrical energy. The energy conversion device is electrically connected to the electrically-powered airflow-inducing device for allowing electrical power generated by the energy conversion device to be provided to the electrically-powered airflow-inducing device.

In another embodiment of the present invention, a computer system comprises a chassis, a plurality of interconnected panels mounted on the chassis in a manner defining an interior space at least partially encompassed by the panels, a circuit assembly, an electrically-powered fan within the interior space, and an energy conversion device mounted within the interior space. One or more of the panels has an airflow opening therein. The circuit assembly is mounted on the chassis within the interior space and includes a heat generating system component. The heat generating system component includes a surface from which energy in the infrared (IR) electromagnetic spectrum is emitted during operation thereof. The energy conversion device is configured for converting the emitted infrared energy to electrical energy and is electrically connected to the electrically-powered fan for providing the electrical energy thereto.

In another embodiment of the present invention, a system comprises an enclosure having an interior space therein, a power supply within the interior space, a circuit assembly having a heat generating system component mounted thereon, an electrically-powered fan, and an energy conversion devices mounted within the interior space. The power supply is configured for converting electrical energy of a first electrical energy specification to electrical energy of a second electrical energy specification. The power supply includes a surface from which energy in the infrared (IR) electromagnetic spectrum is emitted during operation thereof. The electrically-powered fan is mounted on the enclosure in a manner for allowing circulation of air between an ambient environment and the interior space. The circuit board is electrically connected to the power supply. The heat-generating component includes a surface from which energy in the infrared electromagnetic spectrum is emitted during operation thereof. The energy conversion device is configured for converting the emitted infrared energy of the power supply and/or the circuit board to electrical energy of the second electrical energy specification. The energy conversion device is electrically connected to the electrically-powered fans for providing electrical energy of the second electrical energy specification thereto.

These and other objects, embodiments, advantages and/or distinctions of the present invention will become readily apparent upon further review of the following electrical energy specification, associated drawings and appended claims.

DETAILED DESCRIPTION OF THE DRAWING FIGURES

Figure 1:
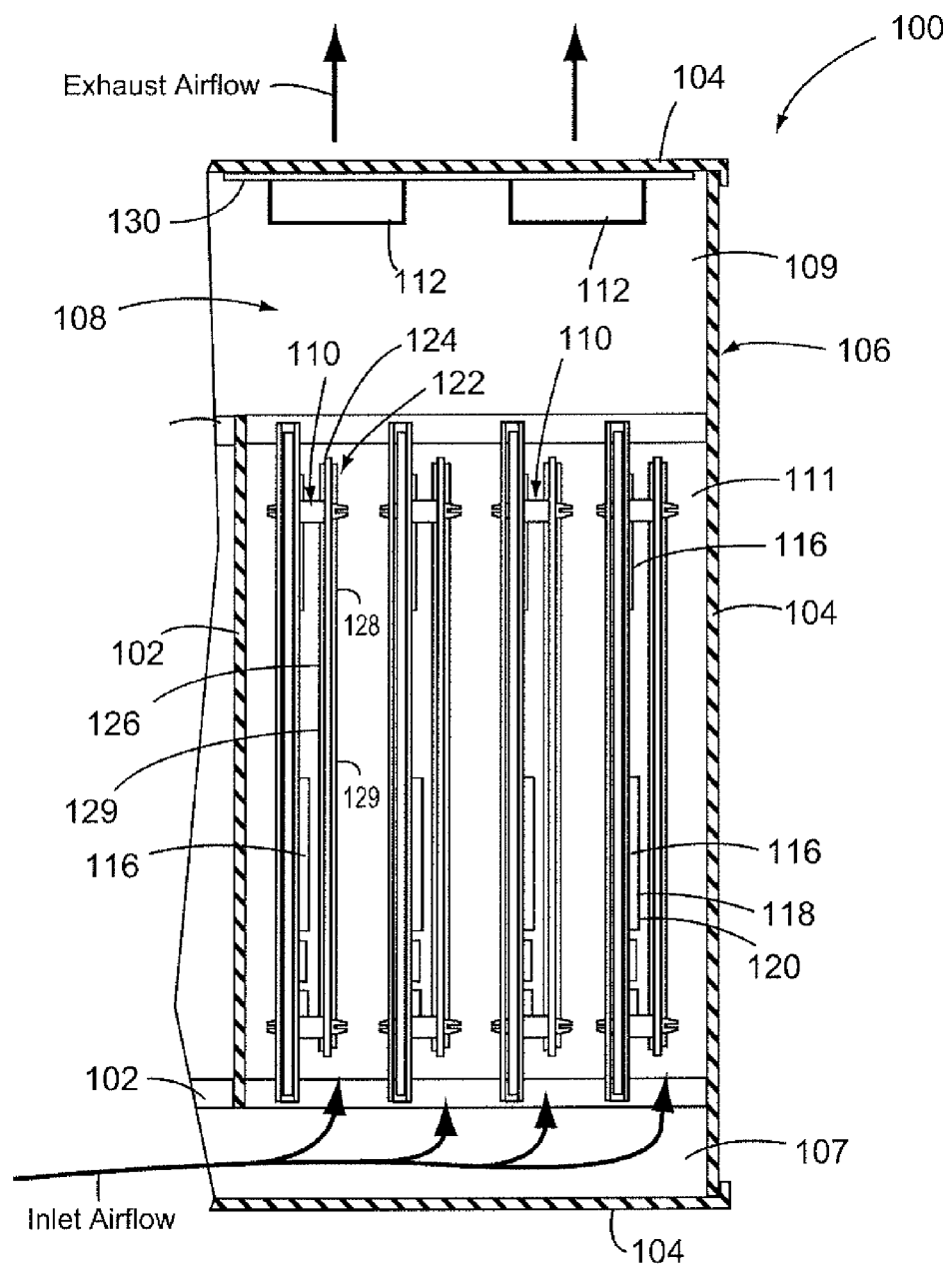
FIG. 1 is a fragmentary top view showing a system configured in accordance with an embodiment of the present invention.
Figure 2:
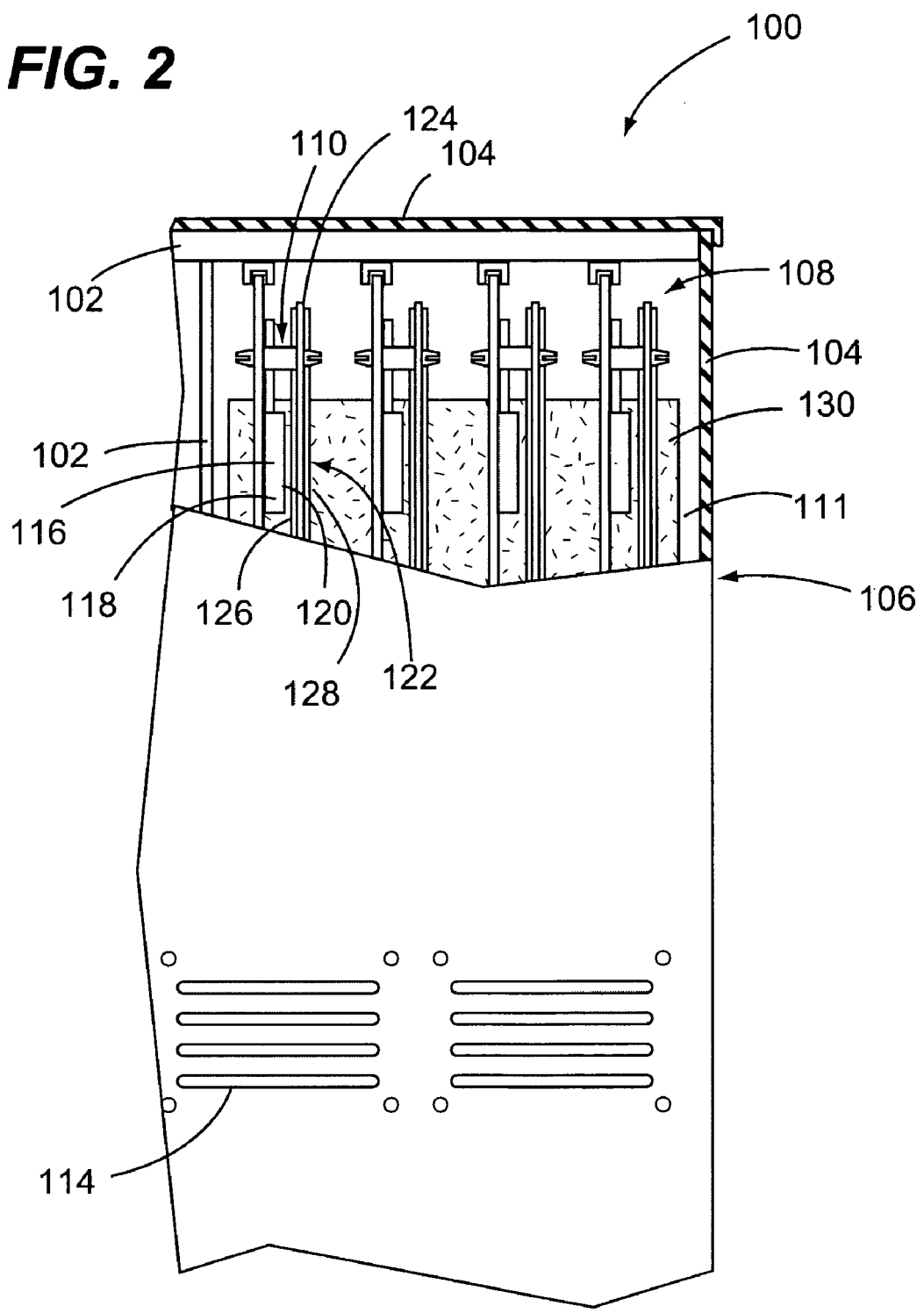
FIG. 2 is a fragmentary rear view of the system shown in FIG. 1.

Referring to FIGS. 1 and 2, a system 100 configured in accordance with an embodiment of the present invention is shown. A chassis 102 has a plurality of panels 104 mounted thereof. The chassis 102 and the panels 104 jointly define an enclosure 106 having an interior space 108 therein. The enclosure 106 can be configured to form an inlet plenum 107, an exhaust plenum 109 and an airflow duct 111 extending between the inlet plenum 107 and the exhaust plenum 109. Jointly, the inlet plenum 107, the exhaust plenum 109, and the airflow duct 111 define an airflow directing structure.

Preferably, the chassis 102 is configured for having one or more circuit assemblies 110 mounted thereon within the airflow duct 111. Examples of a circuit assembly include, but are not limited to, a circuit assembly that provide power supply functionality (e.g., a power supply), a circuit assembly that provide server functionality (e.g., a server), a circuit assembly that provide data processing functionality (e.g., a central processing unit), a circuit assembly that provide storage functionality (e.g., memory) and the like. In one embodiment of the present invention, one of the circuit assemblies 110 is a power supply that provides electrical power to one or more other ones of the circuit assemblies 110. A system configured in accordance with the present invention can include an enclosure configured for having a plurality of rack mountable modules mounted thereon, an enclosure of a laptop computer, an enclosure of a desktop computer, an enclosure of telecommunications equipment, or the like. Preferably, in at least one embodiment of the present invention, the system 100 is a computer system. In view of the disclosures made herein, a skilled person will appreciate that the present invention is not unnecessarily limited to any particular type of enclosure, system, or apparatus, or application thereof.

A plurality of fans 112 (i.e., electrically-powered fans) can be mounted on the enclosure 106 in a manner for allowing circulation of air between an ambient environment (i.e., an environment outside the interior space 108) and the interior space 108 of the enclosure 106. In the depicted embodiment, the fans 112 are mounted within the exhaust plenum 109 on the panel 104 defining the exhaust plenum 109. The panel 104 on which the fans 112 are mounted includes a plurality of airflow openings 114. The fans 112 are mounted over at least a portion of the airflow openings 114. The fans 112 are one embodiment of an electrically-powered airflow inducing device. Other examples of electrically-powered airflow inducing device include, but are not limited to, blowers, air pumps, and the like. It is disclosed herein that one or both of the fans 112 can be mounted in a manner or location different than that shown while still providing for the underlying functionality of extracting heat from within the enclosure 106.

Each one of the circuit assemblies 110 can have one or more system components 116 mounted thereon. One or more of the system components 116 can be a heat generating system component (e.g., heat generating system component 118). Each heat generating system component 118 includes a surface 120 from which energy in the infrared electromagnetic spectrum is emitted during operation thereof. In effect, the surface 120 is an IR energy (i.e., heat) emitting surface.

As shown, each one of the circuit assemblies 110 can have an energy conversion module 122 mounted thereon. Each energy conversion module 122 can include a substrate 124 having a surface facing toward the attached circuit assembly 110 (i.e., the inboard facing side) and a surface facing away from the attached circuit assembly 110 (i.e., outboard facing side). Furthermore, each energy conversion module 122 can include an inboard facing energy conversion device 126 mounted on the inboard facing side of the substrate 124 and an outboard facing energy conversion device 128 mounted on the outboard facing side of the substrate 124. Preferably, the inboard facing energy conversion device 126 of each circuit assembly 110 is mounted and/or arranged in a manner whereby it faces the system component(s) 116 emitting the greatest amount of IR energy and the outboard facing energy conversion device 128 of each circuit assembly 110 is mounted and/or arranged in a manner whereby it faces apportion of an adjacent circuits assembly that emits the greatest amount of IR energy. Additionally, an enclosure mounted energy conversion device 130 can be mounted within the exhaust plenum 109 to being acted in by IR energy of air flowing through the airflow directing structure. For example, the enclosure mounted energy conversion device 130 can be mounted on a surface of a panel 104 defining the exhaust plenum 109 or can be mounted on a portion of the chassis 102 within the exhaust plenum 109. Each energy conversion device 126, 128 includes a surface 129 at which energy in the infrared electromagnetic spectrum is captured. In effect the surface 129 is an IR energy (i.e., heat) capturing surface. Accordingly, it is disclosed herein that embodiments of the present invention can be configured for having a circuit assembly and an energy conversion device jointly arranged such that an IR emitting surface of a heat generating system component faces an IR energy capturing surface of the energy conversion device, for having a power supply and an energy conversion device jointly arranged such that the IR emitting surface of the power supply faces an IR energy capturing surface of the energy conversion device, or both. Additionally, an enclosure mounted energy conversion device 130 can be mounted within the exhaust plenum 109 for being acted in by IR energy of air flowing through the airflow directing structure (e.g., air having extracted heat from one of more of the heat generating system components 118). For example, the enclosure mounted energy conversion device 130 can be mounted on a surface of a panel 104 defining the exhaust plenum 109 or can be mounted on a portion of the chassis 102 within the exhaust plenum 109.

It is disclosed herein that an energy conversion device in accordance with the present invention is configured for converting infrared energy to electrical energy. Thus, advantageously, the energy conversion devices 126, 128, 130 are configured for converting infrared energy to electrical energy and, although not specifically shown in FIGS. 1 and 2, the energy conversion devices 126, 128, 130 are electrically connected to the fans 112 for providing such electrical energy to the fans 112. It is disclosed herein that each one of the fans 112 can be connected to less than all of the energy conversion devices 126, 128, 130. It is also disclosed herein that each one of the fans 112 can be connected to all of the energy conversion devices 126, 128, 130. As such, embodiments of the present invention are not unnecessarily limited to any particular manner in which fans thereof are electrically connected to IR energy conversion devices thereof.

In operation, emitted IR energy from the heat generating components 118 is converted to electrical energy by one or more of the energy conversion devices 126, 128, 130. The greater the amount of IR energy converted to electrical energy, the more electrical energy is available for powering the fans 112. As such, the system 100 can be configured such that the speed of the cooling fans 112 or the number of the fans 112 operating is dependent upon the amount of IR energy being converted to electrical energy by the energy conversion devices 126, 128, 130.

Figure 3:
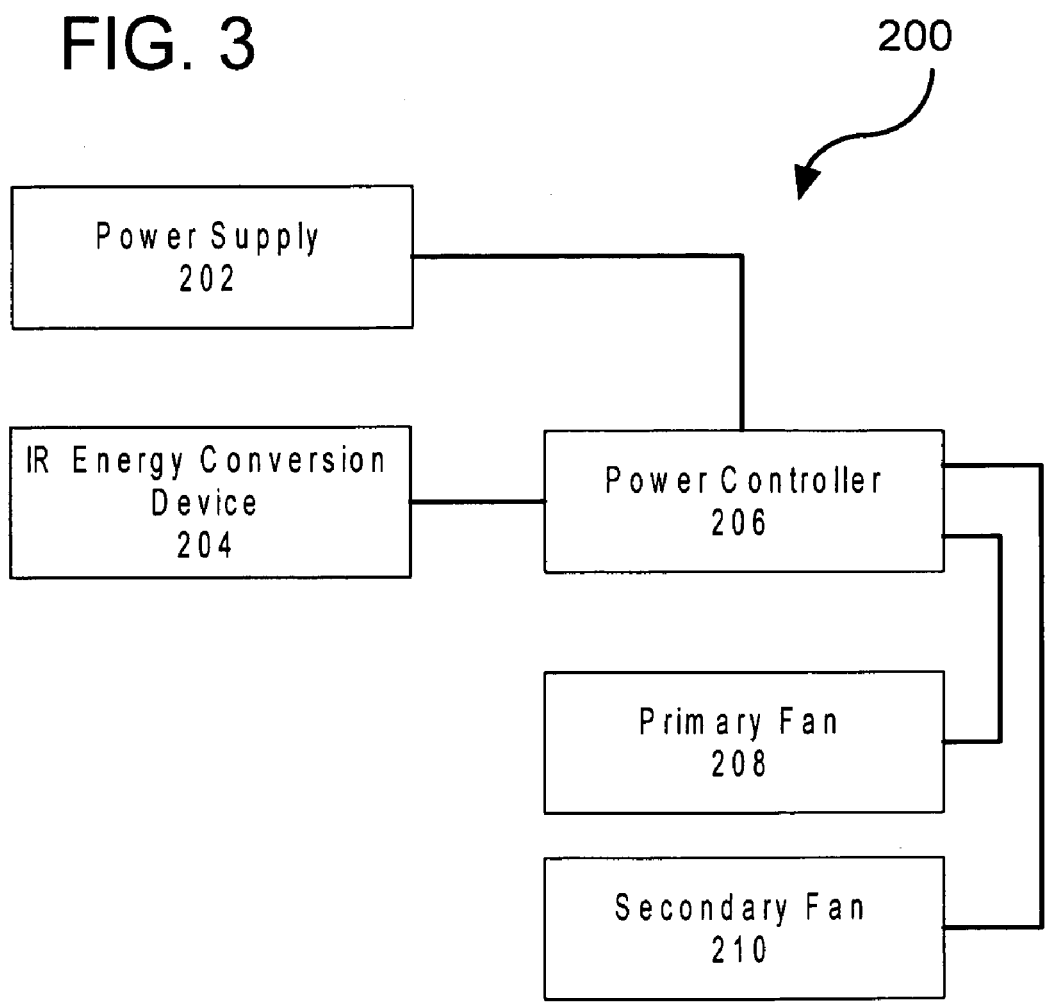
FIG. 3 is a schematic diagram view of an IR powered fan apparatus configured in accordance with an embodiment of the present invention.

Referring now to FIG. 3, a schematic diagram shows an IR powered fan apparatus 200 configured in accordance with an embodiment of the present invention. The apparatus 200 includes a power supply 202, an IR energy conversion device 204, a power controller 206, a primary fan 208, and a secondary fan 210. The power supply 202, the IR energy conversion device 204, the primary fan 208, and the secondary fan 210 can be connected to the power controller 206. The power controller is configured for managing distribution of power from the power supply 202 and the IR energy conversion device 204 to the fans 208, 210. For example, the power controller 206 can allocate power of the power supply 202 and the IR energy conversion device 204 such that the power supply 202 provides sufficient power to operate one or both of the fans 208, 210 in the case where the IR energy conversion device 204 cannot provide sufficient power to the fans 208, 210. Such a situation might occur during a condition where available power from the IR energy conversion device 204 cannot operate the fans at a speed required for providing required airflow (e.g., airflow required to maintain associated system components within a required temperature zone). The power controller 206 can also be configured to allocate power on a per-fan basis (e.g., operation of the primary fan 208 only, operation of the secondary fan only, or simultaneous operation of both fans).

In general, the power supply 202 is configured for converting electrical energy of a first electrical energy specification to electrical energy of a second electrical energy specification. For example, the first electrical energy specification can correspond to line voltage (e.g., 110 VAC) whereas the second electrical energy specification can correspond to component voltage requirements (e.g., 24 VDC). Thus, it can be seen that the fans 208, 210 operate on electrical energy in accordance with the second electrical energy specification. Preferably, electrical energy outputted from the IR energy conversion device 204 is in accordance with the second electrical energy specification. In situations where electrical energy outputted by the IR energy conversion device 204 is different than that of the fans 208, 210, a device such as the power controller 206 can be used for transforming such outputted electrical energy to the electrical energy specification of the fans 208, 210.

It is disclosed herein that, in some embodiments, the power controller 206 can be integral with the power supply 202. Accordingly, in such embodiments, the IR energy conversion device 204 is connected to the fans 208, 210 through the power supply 202. It is also disclosed herein that the power supply and/or the IR energy conversion device can be connected directly to one or both of the fans 208, 210.

The underlying principle of converting IR energy to electrical energy through the use of multi-layer IR energy conversion substrates (i.e., IR energy converting devices) has been proven. Such technology is commonly referred to as IR solar cell technology. IR energy conversion technology (i.e., IR energy to electrical energy) through the use of thin-film IR energy absorbing energy conversion cells is being developed by several entities. In particular, these entities are working to further reduce cost of thin film IR energy converting substrates and to improve the operating efficiency of such thin film IR energy converting substrates. Examples of publicly-known entities that are developing commercialized embodiments of such thin film IR energy converting substrates include, but are not limited to, Solexant of San Jose, Calif.; the Idaho National Laboratory (INL); and the University of Toronto. A skilled person will find the teachings of US published patent applications having publications nos. 20080230120, 20080142075, 20080110494 instructive with regard to IR solar cell technology as it related to embodiments of the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A forced induction airflow apparatus for a computer system, comprising:
   an enclosure having an interior space therein, wherein the enclosure is configured for having system component mounted thereon within the interior space;
   an electrically-powered airflow-inducing device mounted on the enclosure in a manner for allowing circulation of air between an ambient environment and the interior space;
   an energy conversion device mounted within the interior space, wherein the energy conversion device is configured for converting infrared (IR) energy emitted by the system component to electrical energy, wherein the energy conversion device is electrically connected to the electrically-powered airflow-inducing device for allowing electrical power generated by the energy conversion device to be provided to the electrically-powered airflow-inducing device; and
   an airflow directing structure engaged with the electrically-powered airflow-inducing device in a manner allowing airflow generated by the electrically-powered airflow-inducing device to flow therethrough, wherein the energy conversion device is mounted within the airflow directing structure, wherein the system component and the energy conversion device are spaced away from each other in a direction substantially perpendicular to a direction of said airflow through the airflow directing structure and for causing a portion of said airflow to flow between system component and the energy conversion device.

2. The apparatus of claim 1 wherein the energy conversion device includes at least one thin-film IR energy absorbing energy conversion cell.

3. The apparatus of claim 1 wherein:
   the energy conversion device is mounted on a circuitry assembly comprising the system component; and
   the system component is mounted on the circuit assembly in a manner forming an air space extending between an IR energy emitting surface of the system component and an IR energy capturing surface of the energy conversion device and in a manner such that a common axis extends substantially perpendicularly through both the IR energy emitting surface of the system component and the IR energy capturing surface of the energy conversion device.

4. The apparatus of claim 3 wherein the energy conversion device includes at least one thin-film IR energy absorbing energy conversion cell.

5. The apparatus of claim 4 wherein the at least one thin-film IR energy absorbing energy conversion cell includes thin-film IR energy absorbing energy conversion cells.

6. A computer system, comprising:
a chassis including a plurality of interconnected panels, wherein said plurality of interconnected panels jointly define an interior space at least partially encompassed thereby and wherein at least one of said plurality of interconnected panels has an airflow opening therein;
a circuit assembly mounted on the chassis within the interior space, wherein the circuit assembly includes a heat generating system component, wherein said the heat generating system component includes a surface from which energy in the infrared (IR) electromagnetic spectrum is emitted during operation thereof;
an electrically-powered fan mounted on at least one of the interior space and one of said plurality of interconnected panels in a manner allowing airflow generated by the electrically-powered fan to flow through the airflow opening; and
a plurality of energy conversion modules mounted within the interior space, wherein each one of said energy conversion modules includes a first energy conversion device mounted on a first side of a substrate thereof and a second energy conversion device mounted on a second side of the substrate thereof, wherein said first and second energy conversion devices are each configured for converting a respective portion of said emitted infrared energy to electrical energy, wherein the circuit assembly is positioned between a first one of said energy conversion modules and a second one of said energy conversion modules such that a first IR energy emitting surface of the circuit assembly faces an IR energy capturing surface of the first energy conversion device of the first one of said energy conversion modules and a second IR energy emitting surface of the circuit assembly faces an IR energy capturing surface of the second energy conversion device of the second one of said energy conversion modules, wherein the circuit assembly is spaced away from each one of said energy conversion modules in a direction substantially perpendicular to a direction of said airflow through a airflow directing structure and for causing a first portion of said airflow to flow between the circuit assembly and the first one of said energy conversion modules and a second portion of said airflow to flow between the circuit assembly and the second one of said energy conversion modules, and wherein at least one of said energy conversion devices is electrically connected to the electrically-powered fan for providing said electrical energy thereof to the electrically-powered fan.

7. The computer system of claim 6 wherein said first energy conversion device and said second energy conversion device includes thin-film IR energy absorbing energy conversion cells.

8. A system, comprising: an enclosure having an interior space therein; a power supply within the interior space, wherein the power supply is configured for converting electrical energy of a first electrical energy specification to electrical energy of a second electrical energy specification, wherein the power supply includes a power supply surface from which energy in the infrared (IR) electromagnetic spectrum is emitted during operation thereof;
a circuit assembly having a heat generating system component mounted thereon, wherein the circuit assembly is electrically connected to the power supply, wherein the heat-generating system component includes a component surface from which energy in the infrared electromagnetic spectrum is emitted during operation thereof;
an electrically-powered fan mounted on the enclosure in a manner for allowing circulation of air between an ambient environment and the interior space;
an energy conversion device mounted within the interior space on the circuit assembly, wherein the energy conversion device is configured for converting said emitted infrared energy of at least one of the power supply and the circuit assembly to electrical energy of the second electrical energy specification, wherein the energy conversion device is electrically connected to the electrically-powered fan for providing electrical energy of the second electrical energy specification thereto; and an airflow directing structure engaged with the electrically-powered fan in a manner allowing airflow generated by the electrically-powered fan to flow therethrough, wherein the power supply, circuit assembly and the energy conversion device are mounted within the airflow directing structure, wherein the circuit assembly and the energy conversion device are spaced away from each other in a direction substantially perpendicular to a direction of said airflow through the airflow directing structure and in a manner for causing a portion of said airflow to flow between the circuit assembly and said the energy conversion device.

9. The system of claim 8 wherein:
the energy conversion device is mourned on the circuit assembly in a manner forming an air space extending between the IR energy emitting component surface of the heat generating system component and a first IR energy capturing surface of the energy conversion device and in a manner such that a common axis extends substantially perpendicularly through both the IR energy emitting component surface of the heat generating system component and the first IR energy capturing surface of the energy conversion device.

10. The system of claim 9 wherein:
the circuit assembly and the energy conversion device are jointly arranged such that the IR energy emitting component surface of the heat generating system component faces the first IR energy capturing surface of the energy conversion device; and
the power supply and the energy conversion device are jointly arranged such that the IR energy emitting power supply surface of the power supply faces a second IR energy capturing surface of the energy conversion device.

11. The system of claim 8 wherein at least one of
the circuit assembly and the energy conversion device are jointly arranged such that the IR energy emitting component surface of the heat generating system component faces a first IR energy capturing surface of the energy conversion device; and
the power supply and the energy conversion device are jointly arranged such that the IR energy emitting power supply surface of the power supply faces a second IR energy capturing surface of the energy conversion device.

* * * * *